United States Patent [19]

McKinley

[11] Patent Number: 5,059,009
[45] Date of Patent: Oct. 22, 1991

[54] ENDOSCOPE RELAY LENS

[75] Inventor: Harry R. McKinley, Southampton, Mass.

[73] Assignee: McKinley Optics, Incorporated, Southampton, Mass.

[21] Appl. No.: 507,877

[22] Filed: Apr. 12, 1990

[51] Int. Cl.$^5$ .................. G02B 17/00; G02B 3/04
[52] U.S. Cl. .................... 359/435; 359/708
[58] Field of Search .................... 350/572–574, 350/501, 504, 505, 432, 447, 474, 480, 96.18, 96.26, 96.31; 128/4, 6

[56] References Cited

U.S. PATENT DOCUMENTS

| | | | |
|---|---|---|---|
| 2,828,669 | 4/1958 | Peckham | 350/506 |
| 4,148,550 | 4/1979 | Macanally | 350/320 |
| 4,148,551 | 4/1979 | Macanally | 350/320 |
| 4,158,475 | 6/1979 | Dianetti et al. | 350/50 |
| 4,168,882 | 9/1979 | Hopkins | 350/179 |
| 4,358,810 | 5/1983 | Hamou | 350/520 |
| 4,545,652 | 10/1985 | Hoogland | 350/573 |
| 4,575,195 | 3/1986 | Hoogland | 350/432 |
| 4,779,613 | 10/1988 | Hashiguchi et al. | 128/6 |

FOREIGN PATENT DOCUMENTS 207215 12/1982 Japan.

Primary Examiner—Bruce Y. Arnold
Assistant Examiner—James Phan
Attorney, Agent, or Firm—Malcolm J. Chisholm, Jr.

[57] ABSTRACT

An endoscope relay lens is disclosed for transmitting an optical image along a narrow cylinder. Relay lenses are typically utilized in pairs to constitute a relay lens set and one or more sets are utilized in medical endoscopes. In the preferred embodiment, the relay lens includes two identical end lenses affixed to opposed ends of a center lens to define a cylinder. The relay lens is symmetrical about a plane bisecting the center of the center lens. The axial length of each end lens is equal to or greater than one-half its diameter. Optimal performance characteristics are achieved when the radii of curvature of the lenses and the axial lengths of the lenses cooperate so that the distance from an object being viewed to the exterior surface of the end lens closest to the object is one-half the distance between relay lenses in a pair and one-half the distance between sets of relay lens pairs. In one embodiment the center lens is spherical.

11 Claims, 2 Drawing Sheets

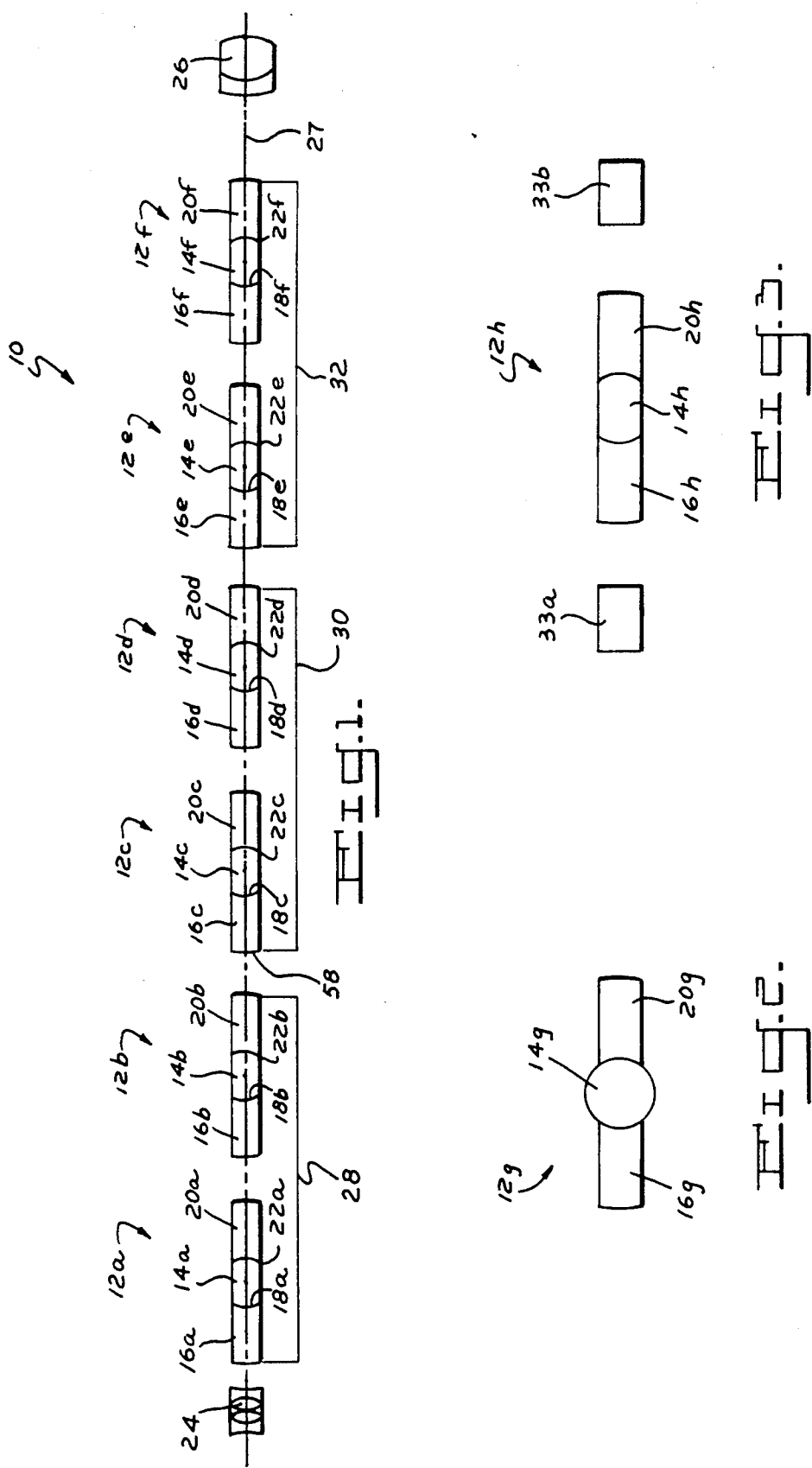

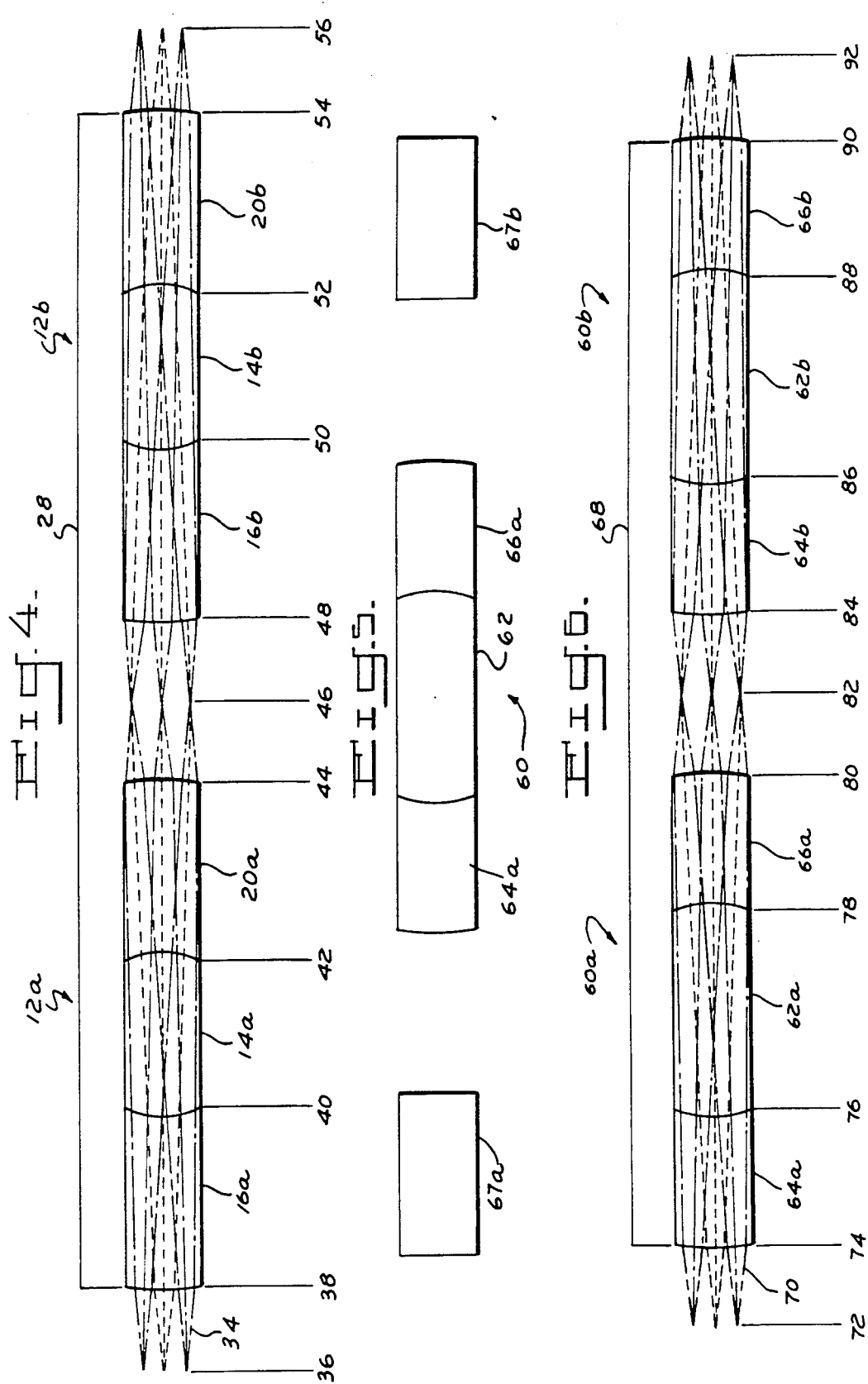

ENDOSCOPE RELAY LENS

BACKGROUND OF THE INVENTION

The present invention relates to optical lens systems utilized in medical endoscopes.

Medical endoscopes are utilized to view specific internal areas of the human body. Typically, endoscopes include a long, thin, rigid, or semi-rigid, optical cylinder affixed to a viewing mechanism. The cylinder is sufficiently narrow to be inserted through natural, or small, surgical body openings. When the endoscope is inserted and positioned for use, an image of the object being viewed is formed at an inserted end of the endoscope by an objective lens. The image passes through a series of relay lenses down the cylinder to an eye lens or video camera at a viewing end of the endoscope.

The relay lenses must be very narrow and are typically around 2.4 mm to 3.0 mm in diameter, and 20 mm to 30 mm long. Each relay lens is usually made of two or more elements and a pair of two relay lenses make up a set of relay lenses. Most endoscopes require two or more sets of relay lens pairs for proper operation. The number of sets depends on the length and specific requirements of a particular endoscope.

Additionally, unique optical characteristics of each relay lens require specific spacing distances between a pair of relay lenses within a set, and between sets of relay lens pairs within an endoscope. The required distances are maintained by hollow, cylindrical, interlens spacers.

Known relay lenses generally comprise one or two relatively thin end lenses affixed to a substantially thicker center lens. Where one end lens is affixed to a center lens the resulting relay lens is frequently referred to as a "doublet". And, where two end lenses are affixed to opposed ends of a center lens, the relay lens is referred to as a "triplet". Both doublets and triplets are shown in U.S. Pat. No. 4,575,195 to Hoogland.

Problems associated with known relay lenses include the high cost of accurately affixing the end lenses to the center lens. Typically, lenses are assembled within standard optical "V-blocks", but the thin end lens tend to be unstable unless mechanically supported within the "V-blocks" during cementing. The diameter-to-thickness ratio of most end lenses is roughly comparable to that of standard corrective contact lenses. The difficulty of affixing such end lenses is exacerbated in the manufacture of triplets because the end lenses have to be precisely aligned on the opposed ends of the center lens, whereby all three lenses share a common central axis.

An additional problem associated with known relay lenses is the requirement that the relay lenses and interlens spacers be inserted into the optical cylinder of the endoscope in a specific alignment and in a specific order. Frequently, during assembly of the endoscope, relay lenses are put in upside down, or in the wrong sequence. Also inter-lens spacers are often inserted in the wrong order. The error may not be detected until the endoscope is tested by an end user. Disassembly and extraction of the lenses and spacers is a difficult, time consuming and costly procedure.

Another problem of known relay lenses is the high cost of manufacture of the end and center lenses. Center lenses, in particular, require very delicate procedures. They are relatively long; extremely thin; typically made of glass; and therefore, crack and break easily. Additionally, precisely curved lens surfaces must be formed on each end surface of the center lens. Moreover, some relay lenses utilize different end lenses attached to the same center lens. Essentially, they require manufacture of three separate lenses for each relay lens.

Consequently, because of structural limitations, known relay lenses are difficult to fabricate due to the relatively short axial lengths of their end lenses; they require extreme care in assembly within an endoscope due to the varying alignment and space requirements of the relay lenses and inter-lens spacers; and, they are costly to manufacture due to the relatively long axial lengths of their center lenses and the need for multiple lens surfaces.

Accordingly, it is the general object of the present invention to provide an improved endoscope relay lens that overcomes the problems of the prior art.

It is a more specific object to provide an improved endoscope relay lens that has elements that facilitate assembly of the relay lens due to their relative sizes.

It is another object to provide an improved endoscope relay lens that facilitates alignment and spacing of the relay lenses within an endoscope.

It is yet another object to provide an improved endoscope relay lens that has elements that are substantially less expensive to manufacture than the elements of known relay lenses.

It is still another object to provide an improved endoscope relay lens that has optical performance characteristics that are substantially superior to the performance characteristics of known relay lenses.

The above and other objects and advantages of this invention will become more readily apparent when the following description is read in conjunction with the accompanying drawings.

SUMMARY OF THE INVENTION

An improved optical endoscope relay lens is disclosed for transmitting an optical image along a narrow cylinder. Sets of relay lens pairs are typically secured within a narrow optical cylinder of a medical endoscope.

In a first preferred, or "Type 1", embodiment the invention comprises two identical end lenses that are affixed to opposed ends of a center lens. The axial length of each end lens is equal to or greater than one-half its diameter. And, the center lens is spherical so that its radii of curvature are one-half of its axial length.

In a second preferred, or "Type 2", embodiment, identical end lenses, having axial lengths equal to or greater than one-half of their diameters, are affixed to opposed ends of a center lens. The opposed ends of the center lens have identical radii of curvature.

In both embodiments, the distance from the object being viewed to the exterior surface of the end lens closest to the object is one-half the distance between relay lenses in a pair, and one-half the distance between sets of relay lens pairs.

Therefore, the relay lenses of both embodiments are symmetrical about an axis passing through the center of the center lens, perpendicular to the passage of light through the relay lens. Consequently, the relay lenses cannot be improperly inserted into the optical cylinder of an endoscope. They function properly in either axial alignment. Additionally, because the required distance between pairs of relay lenses and sets of relay lens pairs is identical, only one size inter-lens spacer is required. Accordingly, in inserting the relay lenses into the endoscope, an operator simply inserts a relay lens, spacer, relay lens, spacer, etc. An assembly error is virtually impossible because the relay lenses are identical and symmetrical as are the inter-lens spacers.

In fabrication of the first preferred, or Type 1, embodiment, the center lens can be made extremely accurately at large volume and low cost because it is made from a ball or sphere. The identical end lenses are made in traditional optical shop methods, but in double quantity, and, therefore, lower cost than non-identical end lenses. Similarly, in fabrication of the second, or Type 2, preferred embodiment, the identical end lenses can be produced at lower cost than in known relay lens.

The cementing operation in both embodiments is greatly facilitated because the end lenses, in particular, are quite long, compared to known end lenses. Therefore, they can lie straight and centered in an optical "V-block" during cementing. With relay lenses of the Type 1 embodiment, a very advantageous cementing can be utilized by first cementing an end lens anywhere on a sphere of center lens glass. Next, the sphere is polished down to a cylinder having the same diameter as that of the affixed end lens. Then, the delicate operation of properly aligning the last end lens can be undertaken and facilitated through the handling advantages of the long, previously cemented together end lens and center lens.

BRIEF DESCRIPTION OF THE DRAWINGS

FIG. 1 is an optical schematic view of an endoscope constructed in accordance with the present invention, wherein three sets of relay lens pairs are disposed between an objective lens and an eye lens.

FIG. 2 is an optical schematic view of a first preferred, or Type 1, embodiment of a relay lens of FIG. 1, showing a center lens as a sphere.

FIG. 3 is an optical schematic view of a relay lens of FIG. 2 showing the center lens as a cylindrical, spherical lens, also showing detached, identical inter-lens spacers.

FIG. 4 is an optical schematic view of a pair of the relay lenses of FIG. 3, constituting a set of Type 1 relay lenses, showing light rays passing through the set.

FIG. 5 is an optical schematic view of a second preferred, or Type 2, embodiment of a relay lens constructed in accordance with the present invention, also showing detached, identical inter-lens spacers.

FIG. 6 is an optical schematic view of a pair of the relay lenses of FIG. 5, constituting a set of Type 2 relay lenses, showing light rays passing through the set.

DETAILED DESCRIPTION OF THE PREFERRED EMBODIMENTS

The endoscope relay lens of the present invention is suitable for use in standard medical endoscopes of the type disclosed in U.S. Pat. No. 4,148,551 to MacAnally, which is incorporated herein by reference.

Referring to the drawings in detail, the preferred embodiment of a medical endoscope utilizing Type 1 relay lenses is shown in an optical schematic view in FIG. 1 and generally designated by the reference numeral 10. The Type 1 relay lens 12a, b, c, d, e, f basically comprises a center lens 14a, b, c, d, e, f with a first end lens 16a, b, c, d, e, f affixed to a first surface 18a, b, c, d, e, f of center lens 14a, b, c, d, e, f and a second end lens 20a, b, c, d, e, f affixed to a second surface 22a, b, c, d, e, f of center lens 14a, b, c, d, e, f. In the endoscope of FIG. 1, relay lenses 12a, b, c, d, e, f are disposed between an objective lens 24 and an eye lens 26. When the endoscope 10 is straight, objective lens 24, relay lenses 12a, b, c, d, e, f and eye lens 26 share a common central axis 27.

The relay lenses 12a, b, c, d, e, f are arranged in three sets 28, 30, 32 of relay lens pairs. The first set 28 includes a pair of two relay lenses 12a and 12b; the second set includes a pair 12c and 12d; and, the third set includes a pair of relay lenses 12e and 12f.

The distinctive features of the present invention and the Type 1 embodiment of the relay lens, in particular, are best shown in FIG. 2, wherein a first end lens 16g and second end lens 20g are shown affixed to center lens 14g when center lens 14g is a sphere. The end lenses 16g, 20g are sufficiently long to facilitate manipulation of the relay lens 12g during cementing of the end lenses 16g, 20g to the center lens 14g. Typically, a first end lens 16g is cemented to a spherical center lens 14g. Next, the center lens is polished down to a cylinder by standard optical shop methods. Then, the second end lens 20g is aligned properly with the first end lens 16g and center lens 14g and cemented to the center lens 14g in a standard optical "V-block".

FIG. 2 graphically shows the spherical structure of the center lens 14g in a Type 1 embodiment relay lens 12g and the relatively long end lenses 16g, 20g of all embodiments of the present invention. FIG. 3 shows the finished Type 1 embodiment relay lens 12h, wherein end lenses 16h, 20h are affixed to the cylindrical, spherical center lens 14h. Additionally, detached, identical inter-lens spacers 33a, b are shown in FIG. 3.

FIG. 4 shows light rays 34 passing through a first set 28 of Type 1 relay lenses 12a, 12b. The rays 34 and relay lens set 28 define a specific sequence of eleven Type 1 optical surfaces shown in vertical lines. A first Type 1 optical surface 36 defines an object plane. A second Type 1 optical surface 38 defines an exterior surface of first end lens 16a. A third Type 1 optical surface 40 defines an interior surface of first end lens 16a. A fourth Type 1 optical surface 42 defines an interior surface of second end lens 20a. A fifth Type 1 optical surface 44 defines an exterior surface of second end lens 20a. A sixth Type 1 optical surface 46 defines an aperture stop plane. A seventh Type 1 optical surface 48 defines an exterior surface of first end lens 16b. An eight Type 1 optical surface 50 defines an interior surface of first end lens 16b. A ninth Type 1 optical surface 52 defines an interior surface of second end lens 20b. A tenth Type 1 optical surface 54 defines an exterior surface of second end lens 20b. An eleventh Type 1 optical surface 56 defines an image plane.

A working example of a set of Type 1 relay lenses is defined with specificity in Table A.

TABLE A

| McKINLEY RELAY LENS SET, TYPE 1 | | | |
|---|---|---|---|
| SURFACE | RADIUS | THICKNESS | GLASS |
| 36 | — | 3.000 | |
| 38 | 8.525 | 6.787 | SF8 |
| 40 | 3.000 | 6.000 | SSKN8 |
| 42 | −3.000 | 6.787 | SF8 |
| 44 | −8.525 | 3.000 | AIR |
| 46 | — | 3.000 | AIR |
| 48 | 8.525 | 6.787 | SF8 |
| 50 | 3.000 | 6.000 | SSKN8 |
| 52 | −3.000 | 6.787 | SF8 |
| 54 | −8.525 | 3.000 | AIR |
| 56 | — | — | AIR |

In Table A, the numerical value in the columns under "RADIUS" and "THICKNESS" are in millimeters. The "GLASS" descriptions are standard optical glass characterizations as found in the product catalog of the Schott Glass Company of the Federal Republic of Germany. The column "THICKNESS" refers to the distance to the next optical surface. For example, in line with surface 36, the number "3.000" means 3.000 mm to surface 38. The column "RADIUS" refers to the radii of curvature of the respective curved surfaces. In this working example, the lens diameters are 3.000 mm and the overall object-to-image distance is 51.148 mm. The object and image diameters are 1.70 mm.

Tests of the performance characteristics of this working example of a Type 1 relay lens demonstrate a small fraction of a wavelength of Optical Path Difference (OPD) over the entire image area. The example accumulates less than one wavelength of OPD over several sets. Most known relay lenses have at least one wavelength of OPD in some or all of their image area through one set.

In the working example described in Table A and FIGS. 4 and 1, the distance from the first Type 1 optical surface 36 to the second Type 1 optical surface 38 is one-half the distance from the fifth Type 1 optical surface 44 to the seventh Type 1 optical surface 48; and it is also one-half the distance from the tenth Type 1 optical surface 54 to the exterior surface 58 of the first end lens 16c of the next relay lens set 30 (as seen in FIG. 1). Consequently, the distance between relay lenses 12a,12b in a set is the same as the distance between sets of relay lenses 28, 30, 32. Therefore, the length of all inter-lens spacers 33a, b is the same, and the spacers are interchangeable.

FIGS. 5 and 6 show a second preferred, or Type 2, embodiment 60 of the present invention which is very similar to Type 1, except that the Type 2 center lens 62 is not spherical. As seen in FIGS. 5 and 6, Type 2 relay lens 60a, b includes Type 2 center lenses 62a, b first Type 2 end lenses 64a, b affixed to the Type 2 center lenses 62a, b and second Type 2 end lenses 66a, b affixed to center lenses 62a, b. Also shown in FIG. 5 are detached, identical Type 2 inter-lens spacers 67a, b.

As seen in FIG. 6, Type 2 relay lenses 60a, b are arranged in a set 68 of two relay lenses 60a, b. Like Type 1 relay sets 28, 30, 32, when light rays 70 pass through the Type 2 set 68, eleven Type 2 optical surfaces are defined by the rays and relay lenses 60a, b. A first Type 2 optical surface 72 defines an object plane. A second Type 2 optical surface 74 defines an exterior surface of first Type 2 end lens 64a. A third Type 2 optical surface 76 defines an interior surface of first Type 2 end lens 64a. A fourth Type 2 optical surface 78 defines an interior surface of second Type 2 end lens 66a. A fifth Type 2 optical surface 80 defines an exterior surface of second Type 2 end lens 66a. A sixth Type 2 optical surface 82 defines an aperture stop plane. A seventh Type 2 optical surface 84 defines an exterior surface of first Type 2 end lens 64b. An eighth Type 2 optical surface 86 defines an interior surface of first Type 2 end lens 64b. A ninth Type 2 optical surface 88 defines an interior surface of second Type 2 end lens 66b. A tenth Type 2 optical surface 90 defines an exterior surface of second Type 2 end lens 66b. An eleventh Type 2 optical surface 92 defines an image plane.

A working example of a set of Type 2 relay lenses is defined with specificity in Table B.

TABLE B

LENS DATA
McKINLEY RELAY LENS SET, TYPE 2

| SURFACE | RADIUS | THICKNESS | GLASS |
| --- | --- | --- | --- |
| 72 | — | 3.000 | |
| 74 | 7.188 | 5.000 | F4 |
| 76 | 2.710 | 8.258 | BAK2 |
| 78 | −2.710 | 5.000 | F4 |
| 80 | −7.188 | 3.000 | AIR |
| 82 | — | 3.000 | AIR |
| 84 | 7.188 | 5.000 | F4 |
| 86 | 2.710 | 8.258 | BAK2 |
| 88 | −2.710 | 5.000 | F4 |
| 90 | −7.188 | 3.000 | AIR |
| 92 | — | — | AIR |

In Table B, the numerical values in the columns under "RADIUS" and "THICKNESS" are in millimeters. The "GLASS" descriptions are standard optical glass characterizations as found in the product catalog of the Schott Glass Company of the Federal Republic of Germany. As in Table A, the column "THICKNESS" refers to the distance to the next optical surface. The column "RADIUS" refers to the radii of curvature of the respective curved surfaces. In this working example, the lens diameters are 3.000 mm and the overall object-to-image distance is 48.516 mm. The object and image diameters are 1.70 mm.

As with the example described in Table A, the Type 2 working example described in Table B was tested and demonstrated a small fraction of a wavelength of OPD over the entire image area. The example accumulates less than one wavelength of OPD over several sets.

In the working example of a Type 2 relay lens set described in Table B, and FIG. 6, the distance from the first Type 2 optical surface 72 to the second Type 2 optical surface 74 is one-half the distance from the fifth Type 2 optical surface 80 to the seventh Type 2 optical distance 84; and it is also one-half the distance from the tenth Type 2 optical surface 90 to the exterior surface of the next Type 2 relay lens set (not shown). Consequently, the distance between Type 2 relay lens 60a, b in a set 68 is the same as the distance between sets of Type 2 relay lens pairs. Therefore, the length of all Type 2 inter-lens spacers 67a, b is the same, and the spacers are interchangeable.

It is to be understood that the working examples described in Tables A and B are not to be construed as limitations on the present invention. A variety of paper examples has also demonstrated performance characteristics comparable to the aforesaid working examples, while retaining end lenses whose axial lengths are equal to or greater than one-half their diameters, thereby facilitating manipulation of the end and center lenses during fabrication and assembly. The paper examples also define the same relay lens symmetry as in Type 1 and Type 2 relay lenses, for ease of alignment during endoscope assembly. And, those paper examples also include the optical performance characteristics that produce identical spacing requirements between a pair of relay lenses in a set, and between sets of relay lens, as in the described Types 1 and 2 working examples.

It should also be understood by those skilled in the art that obvious structural modifications can be made without departing from the spirit of the invention. For example, the relay lenses of the present invention can be utilized in non-medical optical instruments to transmit an image through a rigid or semi-rigid cylinder. Accordingly, reference should be made primarily to the accompanying claims rather than the foregoing specification to determine the scope of the invention.

Having thus described the invention, what is claimed is:

1. A relay lens for transmitting an optical image, that comprises:
   (a) a center lens that is spherical, so that radii of curvature of the opposed ends of the center lens are one-half of the axial length of the center lens;
   (b) two identical end lenses affixed to opposed ends of the center lens, the end lenses and center lens forming a cylinder, each of said end lenses having an axial length that is equal to or greater than one-half its diameter, so that the relay lens is symmetrical about a plane passing through the center of the center lens perpendicular to an axis passing through the centers of the opposed end lenses.

2. The relay lens of claim 1 wherein radii of curvature of the opposed ends of the center lens are identical.

3. A relay lens set for transmitting an optical image of an object, that comprises a pair of identical relay lenses, each of said relay lenses comprising a center lens and two identical end lenses affixed to opposed ends of the center lens, the end lenses and center lenses forming a cylinder, each of said end lenses having an axial length that is equal to or greater than one-half its diameter, so that the relay lens is symmetrical about a plane passing through the center of the center lens perpendicular to an axis passing through the centers of the opposed end lenses, wherein radii of curvature and axial lengths of the end lenses and center lens cooperate so that optimal performance of the relay lens set is achieved when the distance from the object to the closest relay lens is one-half the distance between the pair of relay lenses in the set.

4. The relay lens set of claim 3 wherein the center lenses are spherical so that radii of curvature of the opposed ends of a center lens are one-half of its axial length.

5. The relay lens set of claim 3 wherein the radii of curvature of the opposed ends of the center lens are identical.

6. The relay lens set of claim 3 wherein the relay lens set transmits an optical image to a second, identical relay lens set and the distance from the object to the closest relay lens is one-half the distance between the relay lens set and the second relay lens set.

7. A relay lens set system for transmitting an optical image of an object through a plurality of relay lens sets that comprises at least a first relay lens set and an identical, adjacent second relay lens set each of said relay lens sets including a pair of identical relay lenses, said relay lenses comprising a center lens and two identical end lenses affixed to opposed ends of the center lens, the end lenses and center lenses forming a cylinder, each of said end lenses having an axial length that is equal to or greater than one-half its diameter, so that the relay lens is symmetrical about a plane passing through the center of the center lens perpendicular to an axis passing through the centers of the opposed end lenses, wherein radii of curvature and axial lengths of the end lenses and center lens cooperate so that optimal performance of the relay lens set system is achieved when the distance from the object to the closest relay lens is one-half the distance between the pair of relay lenses in the first relay lens set and one-half the distance between the first and second relay lens sets.

8. The relay lens set system of claim 7 wherein the distance from the object to the closest relay lens is one-half the distance between any adjacent relay lens sets.

9. The relay lens set system of claim 7 wherein the center lens of each relay lens is spherical so that radii of curvature of the opposed ends of the center lens are one-half of its axial length.

10. A relay lens set for transmitting an optical image of an object, that comprises a pair of identical relay lenses, each of said relay lenses comprising a center lens that is spherical, so that radii of curvature of the opposed ends of the center lens are one-half of the axial length of the center lens, and two identical end lenses affixed to opposed ends of the center lens, the end lenses and center lenses forming a cylinder, each of said end lenses having an axial length that is equal to or greater than one-half its diameter, so that each identical relay lens is symmetrical about a plane passing through the center of the center lens perpendicular to an axis passing through the centers of the opposed end lenses, wherein radii of curvature and axial lengths of the end lenses and center lens cooperate so that optimal performance of the relay lens set is achieved when the distance from the object to the closest relay lens is one-half the distance between the pair of relay lenses in the set.

11. A relay lens set system for transmitting an optical image of an object through a plurality of relay lens sets that comprises at least a first relay lens set and an identical, adjacent second relay lens set each of said relay lens sets including a pair of identical relay lenses, said relay lenses comprising a center lens that is spherical, so that radii of curvature of the opposed ends of the center lens are one-half of the axial length of the center lens, and two identical end lenses affixed to opposed ends of the center lens, the end lenses and center lenses forming a cylinder, each of said end lenses having an axial length that is equal to or greater than one-half its diameter, so that each identical relay lens is symmetrical about a plane passing through the center of the center lens perpendicular to an axis passing through the centers of the opposed end lenses, wherein radii of curvature and axial lengths of the end lenses and center lens cooperate so that optimal performance of the relay lens set system is achieved when the distance from the object to the closest relay lens is one-half the distance between the pair of relay lenses in the first relay lens set and one-half the distance between the first and second relay lens sets.

* * * * *